US010649883B2

(12) United States Patent
Cheng et al.

(10) Patent No.: US 10,649,883 B2
(45) Date of Patent: May 12, 2020

(54) METHOD THAT SUPPORTS MULTITHREADING/CONCURRENT PROGRAMMING DEBUGGING, COMPUTER READABLE RECORDING MEDIUM AND COMPUTER PROGRAM PRODUCT

(71) Applicant: National Central University, Taoyuan (TW)

(72) Inventors: Yung-Pin Cheng, Taoyuan (TW); Chuan Yang, Taoyuan (TW)

(73) Assignee: NATIONAL CENTRAL UNIVERSITY, Taoyuan (TW)

(*) Notice: Subject to any disclaimer, the term of this patent is extended or adjusted under 35 U.S.C. 154(b) by 0 days.

(21) Appl. No.: 16/243,791

(22) Filed: Jan. 9, 2019

(65) Prior Publication Data

US 2019/0213108 A1    Jul. 11, 2019

(30) Foreign Application Priority Data

Jan. 9, 2018   (TW) .............................. 107100710 A

(51) Int. Cl.
*G06F 11/36*     (2006.01)
*G06F 9/52*      (2006.01)

(52) U.S. Cl.
CPC ............ *G06F 11/3632* (2013.01); *G06F 9/52* (2013.01); *G06F 11/3664* (2013.01)

(58) Field of Classification Search
CPC ..... G06F 11/3664; G06F 11/3632; G06F 9/52
See application file for complete search history.

(56) References Cited

U.S. PATENT DOCUMENTS

| | | | |
|---|---|---|---|
| 9,262,299 B1* | 2/2016 | Wilmot | G06F 11/3668 |
| 2005/0210335 A1* | 9/2005 | Muratori | G06F 11/362 |
| | | | 714/35 |
| 2015/0052502 A1* | 2/2015 | Faillaci, III | G06F 11/3636 |
| | | | 717/125 |

* cited by examiner

*Primary Examiner* — Wei Y Zhen
*Assistant Examiner* — Amir Soltanzadeh
(74) *Attorney, Agent, or Firm* — Muncy, Geissler, Olds & Lowe, P.C.

(57) ABSTRACT

A method that supports multithreading/concurrent programming debugging includes the following steps: setting breakpoints of program sections of multithreading; converting the breakpoints into context switch points; executing a planned execution sequence of an interleaving execution path, to start a specified thread to execute a program section thereof till a first execution environment change point; clicking a next thread of the interleaving execution path one after another, and executing the clicked next thread till a next context switch point; and recording and storing the interleaving execution path.

3 Claims, 4 Drawing Sheets

METHOD THAT SUPPORTS MULTITHREADING/CONCURRENT PROGRAMMING DEBUGGING, COMPUTER READABLE RECORDING MEDIUM AND COMPUTER PROGRAM PRODUCT

BACKGROUND

Technical Field

The present invention relates to the field of computer system, and in particular, to a method that supports multithreading/concurrent programming debugging, a computer readable recording medium, and a computer program product.

Related Art

A thread is a minimum unit with which the operating systems can carry out an operational process. The thread is included in a process, and is an actual operational unit in the process. One thread refers to a unique-sequence control stream in a process. There may be multiple concurrent threads in one process, and each thread executes a different task concurrently.

Multithreading refers to a technology for implementing concurrent execution of multiple threads on software or hardware. With the support of hardware, a computer having a multithreading capability can execute more than one thread at the same time, thereby improving overall processing efficiency. A system with such a capability includes a symmetric multiprocessor, a multi-core processor and a chip-level multithreading or simultaneous multithreading processor.

New techniques such as multithreading and concurrent/parallel programming designs are usually introduced to current software systems. However, once the technique is employed, all possible execution paths of the system will expand exponentially, making it more difficult to find concurrency errors.

Concurrency errors are usually hard to detect and debug. There are hardly any effective methods in existing debugging and testing for multithreading or concurrent programming. That is, the only option is to execute as many program paths as possible, to at least detect the presence of errors first. However, during debugging of multithreading or concurrent programming, a schedule of an operating system cannot be controlled by a program designer, that is, the program designer cannot control execution paths of threads or execution environment switching. Therefore, the program designer is unable to know the operating systems controls which thread to execute which thread program section of a to-be-debugged program during debugging. Even if an error of the to-be-debugged program is found, it is extremely difficult to reproduce the execution path of multithreading, and the difficulty of program debugging is also increased.

SUMMARY

In view of the foregoing problem, an objective of the present invention is to provide a method that supports multithreading/concurrent programming debugging, a computer readable recording medium and a computer program product. A schedule of an operating system is aborted in a debugger, and a novel breakpoint-context switch point is provided to control an interleaving execution path. Based on each program section of each thread in a planned execution sequence, an execution path of multithreading can be reproduced easily, thus easily achieving program debugging.

A first aspect of the present invention provides a method that supports multithreading/concurrent programming debugging, applied to a multi-core or multi-CPU computer system, where one to-be-debugged program of multithreading has a plurality of program sections in each thread, and an execution sequence of each program section of each thread is planned to form an interleaving execution path, and the method includes the following steps:

setting a plurality of breakpoints of the plurality of program sections of the multithreading in a program debugging frame displayed on a screen of the computer system;

converting the plurality of breakpoints into a plurality of context switch points in a breakpoint panel window in the program debugging frame displayed on the screen;

executing, by the computer system, the planned execution sequence of the interleaving execution path, to start a specified thread to execute one program section thereof till a first context switch point;

clicking a next thread of the interleaving execution path one after another in a thread control panel window in the program debugging frame displayed on the screen, and executing, by the computer system, the clicked next thread till a next context switch point; and recording and storing the interleaving execution path executed by the computer system.

A second aspect of the present invention provides a computer readable recording medium with a program stored therein, where when a computer system loads the program from the computer readable recording medium and executes the program, the method according to the first aspect of the present invention can be completed.

A third aspect of the present invention provides a computer program product with a program stored therein, where when a computer system loads the program from the computer program product and executes the program, the method according to the first aspect of the present invention can be completed.

DETAILED DESCRIPTION

To enable a person of ordinary skill in the art of the present invention to understand the present invention further, the following specially lists several preferred embodiments of the present invention, and with reference to the accompanying drawings, describes content of the present invention and effects to be achieved in detail.

The method that supports multithreading/concurrent programming debugging according to the present invention is applied to a multi-core or multi-CPU computer system (not shown). The computer system further includes conventional structures such as a memory, a bus, an input/output device and a screen, which are not described in detail herein. The method that supports multithreading/concurrent programming debugging according to the present invention is also applicable to a smart device (such as a tablet computer, a smart phone, or a smart watch) that can employ multithreading/concurrent programming.

Figure 1:
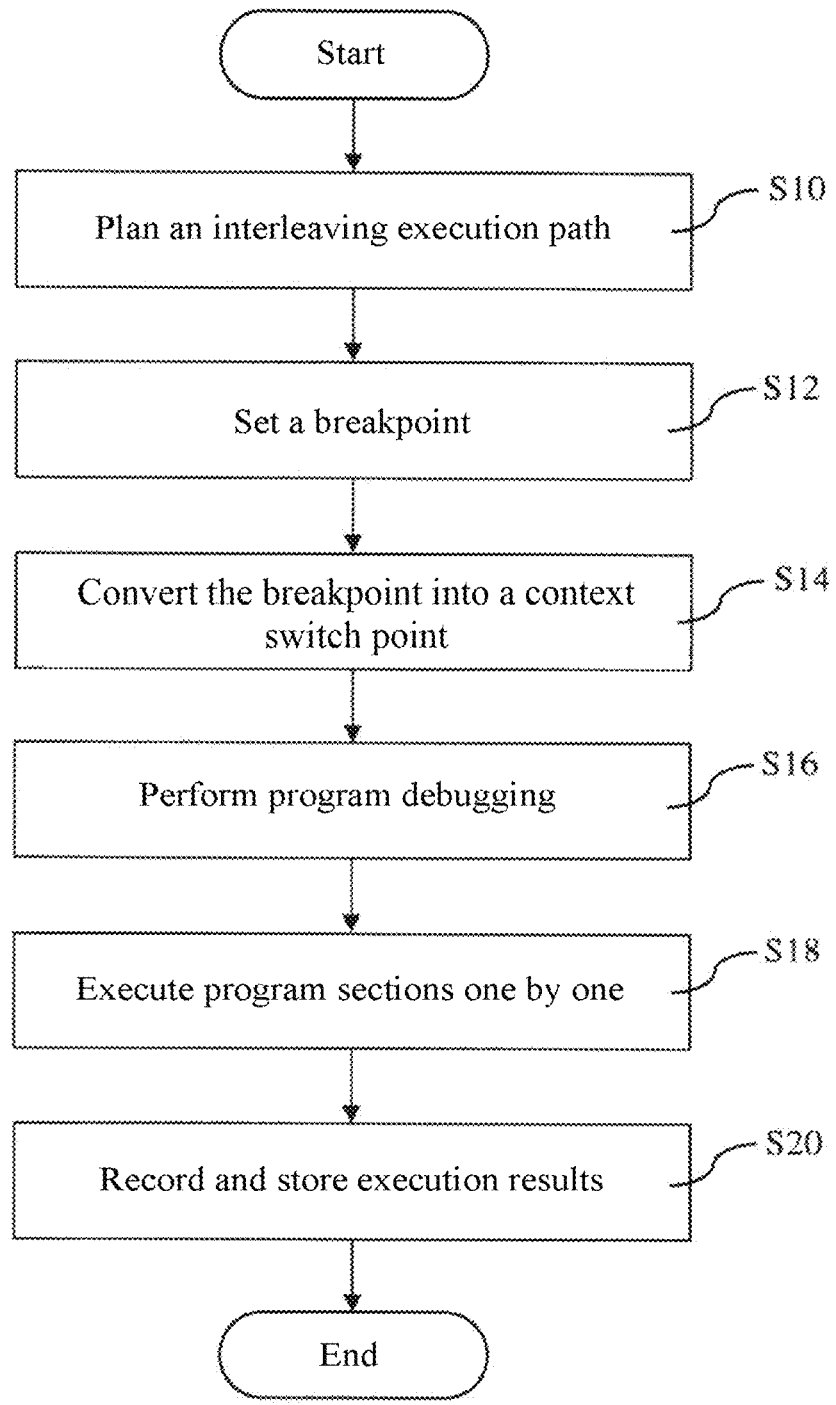
FIG. 1 is a flowchart of a method that supports multithreading/concurrent programming debugging according to the present invention.

FIG. 1 is a flowchart of a method that supports multithreading/concurrent programming debugging according to the present invention. In FIG. 1, during debugging or testing for a to-be-debugged program of multithreading, a program designer divides each thread of the to-be-debugged program into a plurality of program sections, plans different execution sequences of each program section of each thread to form a plurality of interleaving execution paths, and executes as many interleaving execution paths as possible, to detect the presence of an error in the to-be-debugged program (step S10).

Figure 2:
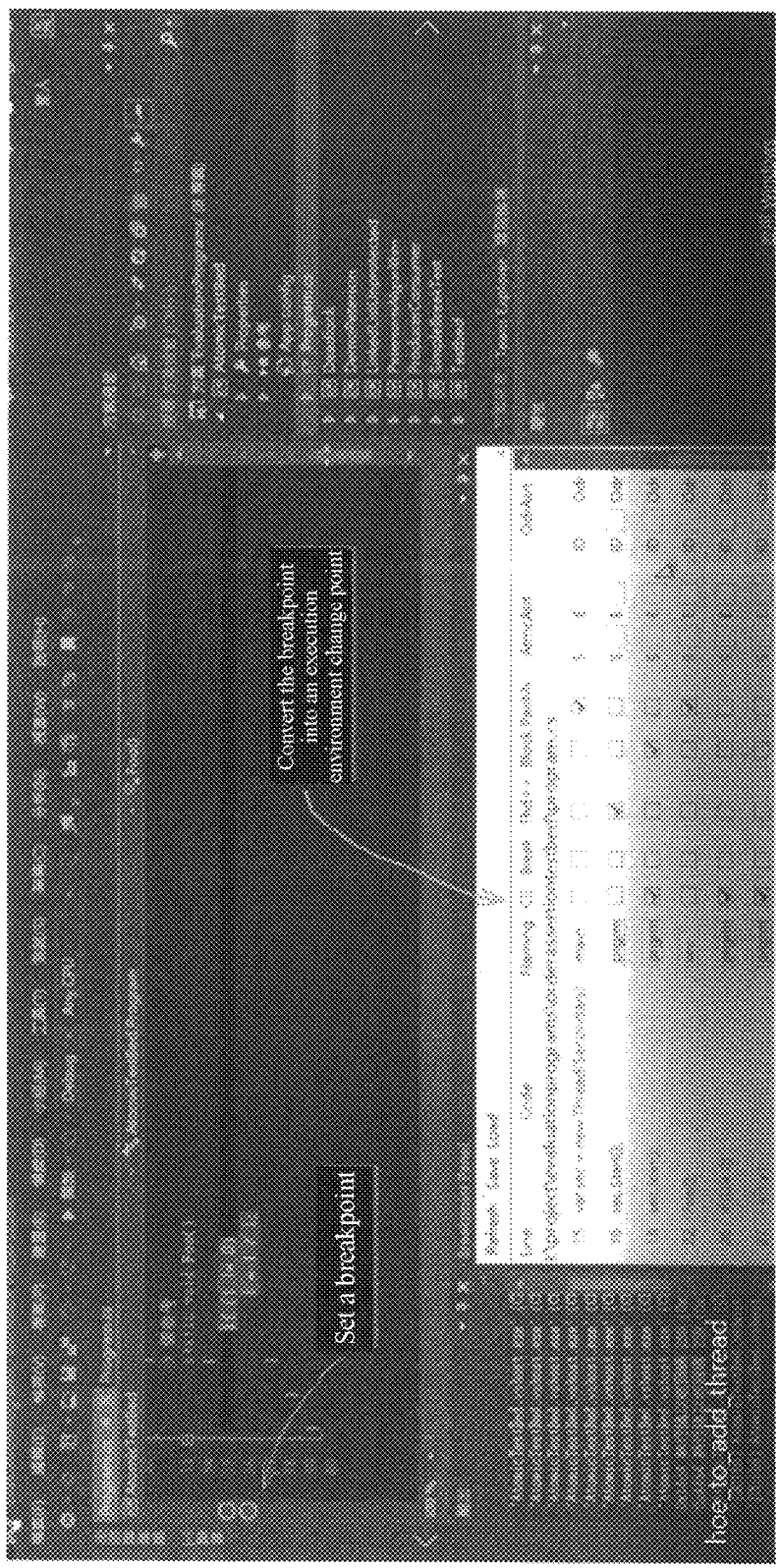
FIG. 2 is a schematic diagram of a program debugging frame according to the present invention.

The computer system loads a to-be-debugged program of which an interleaving execution path has been planned, and displays the to-be-debugged program in a program debugging frame displayed on a screen of the computer system, as shown in FIG. 2, which is a schematic diagram of a program debugging frame according to the present invention.

The program designer sets a plurality of breakpoints of the plurality of program sections of the multithreading of the planned execution sequence of the interleaving execution path in the program debugging frame displayed on the screen of the computer system (step S12), as shown in FIG. 2.

In the debugging program supported by the program debugging frame, a program counter and execution paths of threads are controlled by a schedule of an operating system, and the program designer cannot control planning of the execution sequence of the interleaving execution path during program debugging. Therefore, a debugging program of the present invention is used for aborting the schedule of the operating systems. The program counter and execution paths of threads controlled by the schedule of the operating systems no longer perform program debugging; instead, program debugging is performed by the debugging program of the present invention on the basis of a virtual scheduler (that is, the planned execution sequence of the interleaving execution path).

When the debugging program of the present invention is performed, a breakpoint panel window (as shown in FIG. 2) is displayed in the program debugging frame. The program designer can click a set breakpoint of the to-be-debugged program under a "CS" field of the breakpoint panel window, to convert the breakpoint into a context switch point (step S14).

Next, a "start" option in the program debugging frame is clicked, and the computer system executes the planned execution sequence of the interleaving execution path, so as to start a first thread to execute a first program section thereof, and suspends execution until a first context switch point (step S16). The first thread of the interleaving execution path executed this time is recorded and stored.

Figure 3:
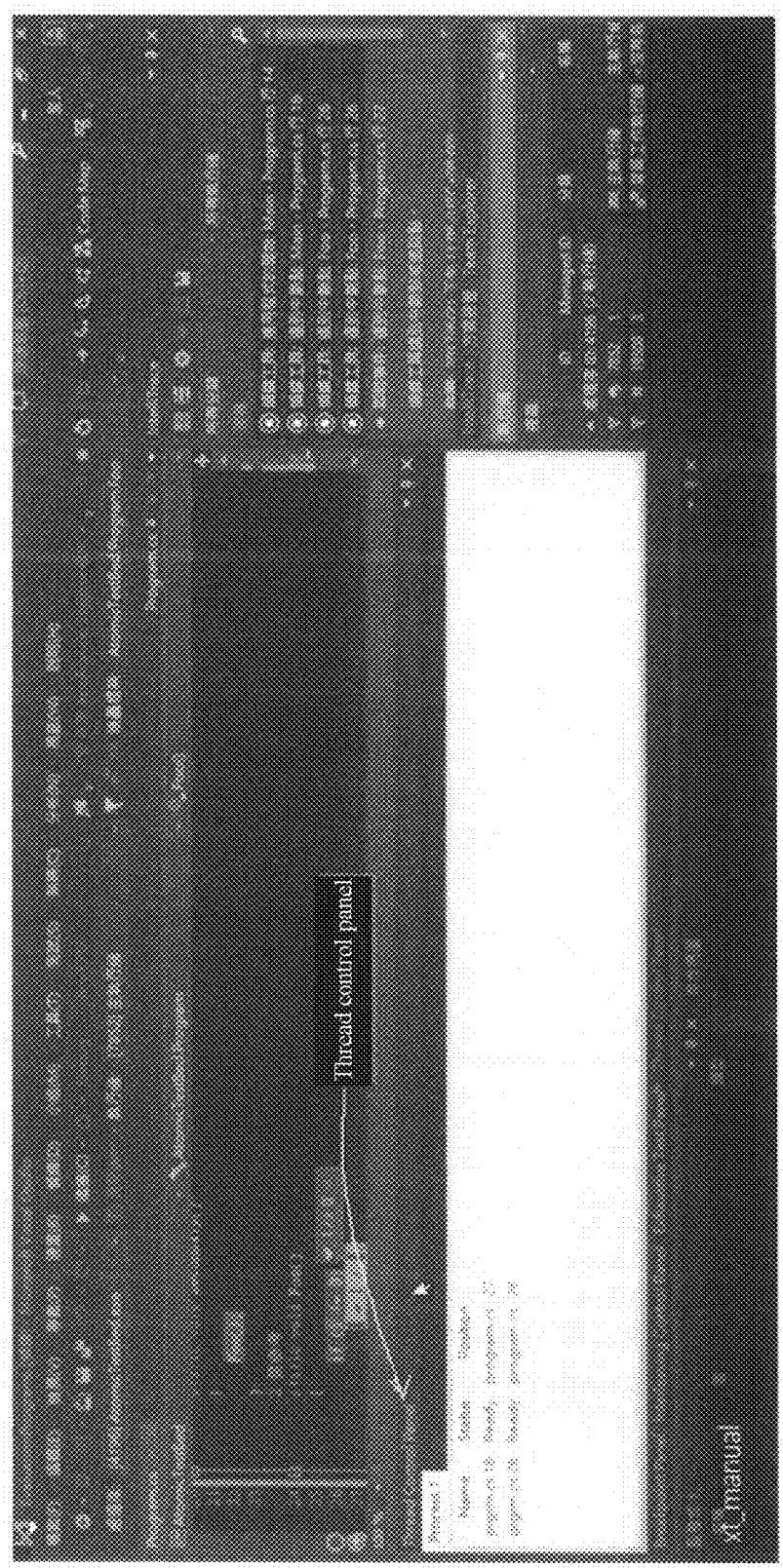
FIG. 3 is a schematic diagram of a program debugging frame in which a thread control panel window is displayed according to the present invention.

In this case, a thread control panel view is displayed in the program debugging frame, as shown in FIG. 3, which is a schematic diagram of a program debugging frame in which a thread control panel window is displayed according to the present invention. A thread that can be selected for execution is displayed in the thread control panel window (for example, Name:prgrm.cs:16, Status:Ready, Position:program.cs:27 in the first line of the thread control panel window in FIG. 3).

After the computer system proceeds to the first context switch point, a next thread is clicked in the thread control panel window (for example, Name:prgrm.cs:26, Status:Ready,Position:program.cs:26 in the second line of the thread control panel window in FIG. 3). The computer system executes a next program section of the next thread, and suspends execution until a set next context switch point. The next thread is the same as or different from the previous thread. The next thread of the interleaving execution path executed this time is recorded and stored.

The programs are performed one after another. After the computer system proceeds to the context switch point, a next thread of the planned execution sequence of the interleaving execution path is clicked in the thread control panel window, the computer system executes the next thread, and the next thread, which is executed one after another, of the interleaving execution path is recorded and stored, until execution of the debugging program of the to-be-debugged program is finished (step S18).

Figure 4:
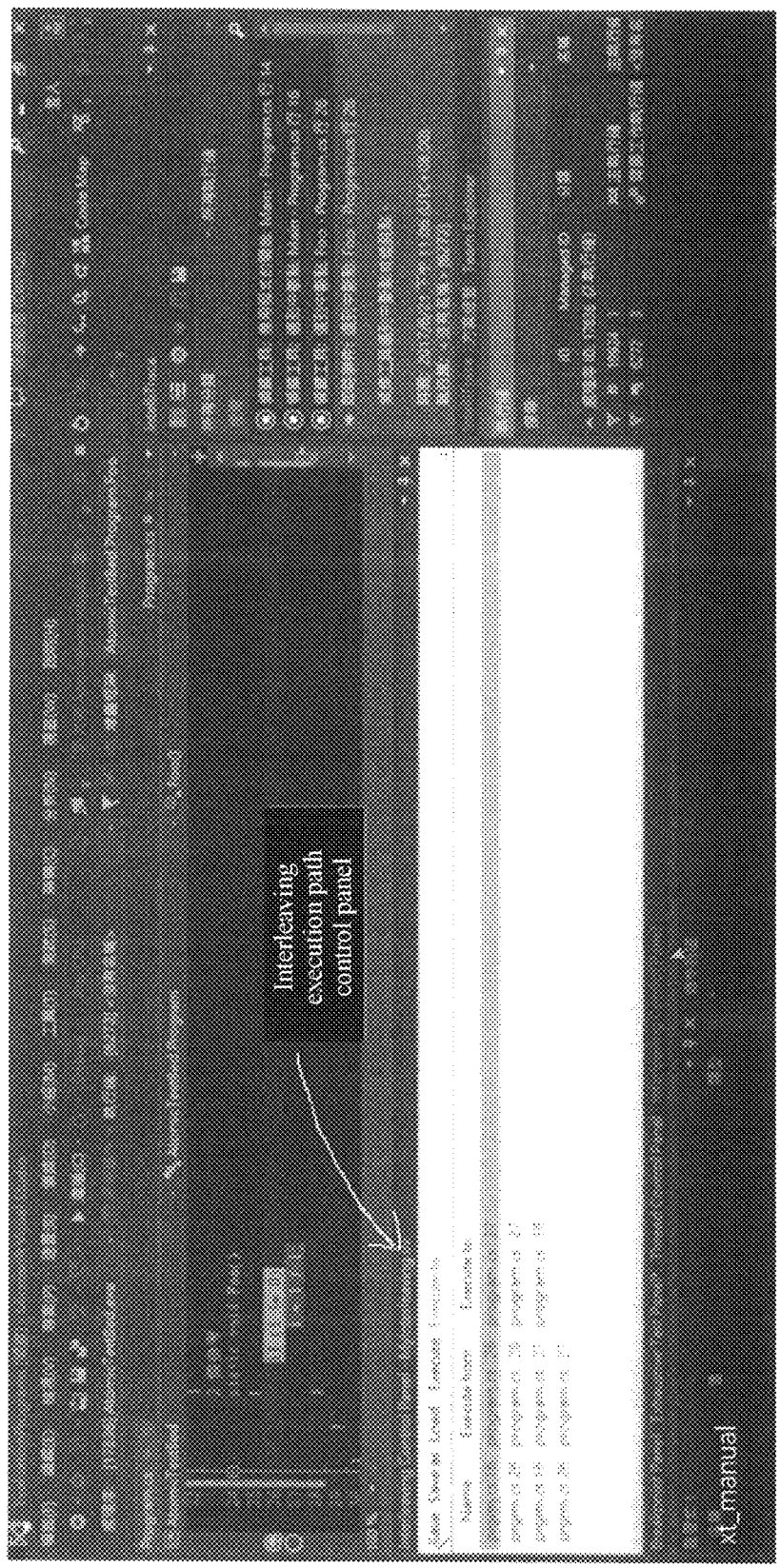
FIG. 4 is a schematic diagram of a program debugging frame in which an interleaving control panel window is displayed according to the present invention.

FIG. 4 is a schematic diagram of a program debugging frame in which an interleaving control panel window is displayed according to the present invention. When executing the interleaving execution path, the computer system will record and store, one by one, each thread of the interleaving execution path executed by the computer system shown in FIG. 4 (for example, Name:prgrm.cs:16, Executefrom:Program.cs:26, Executeto:program.cs:27 in the first line of the interleaving control panel window) (step S20). The interleaving control panel window in the program debugging frame displays each program section of each thread of the interleaving execution path executed by the computer system in a multithreading manner, so that the program designer can check whether the to-be-debugged program has an error. That is, when the program designer wants to debug the to-be-debugged program that has an error, each thread, which is recorded and stored one by one, of the interleaving execution path executed by the computer system is reproduced, and a new breakpoint is set for the threads and an execution environment change point is switched, so as to find the position of the error in the to-be-debugged program.

The foregoing method that supports multithreading/concurrent programming debugging according to the present invention can be implemented in the form of a program, and the program can be stored in a computer readable recording medium. When an automated testing system loads the program from the computer readable recording medium and executes the program, the method steps mentioned in the foregoing description and drawings can be completed.

Similarly, the foregoing method that supports multithreading/concurrent programming debugging according to the present invention can be completed by a computer program product. After the computer system downloads the computer program from the Internet for example, the method steps mentioned in the foregoing description and drawings can be completed.

The present invention provides a method that supports multithreading/concurrent programming debugging, a computer readable recording medium and a computer program product. A schedule of an operating system is aborted in a debugger, and a novel breakpoint-execution environment change point is provided to control an interleaving execution path. Based on each program section of each thread in a planned execution sequence, an execution path of multithreading can be reproduced easily, thus easily achieving program debugging.

Although the present invention is described as above with reference to the preferred embodiments and accompanying exemplary drawings, it is not considered to be limited thereto. Any modification, omission, and variation made by a person skilled in the art to the form and specific embodiments of the present invention do not depart from the scope of the claims of the present invention.

What is claimed is:

1. A method that supports multithreading/concurrent programming debugging, applied to a multi-core or multi-CPU computer system, wherein one to-be-debugged program of multithreading has a plurality of program sections in each thread, and an execution sequence of each program section of each thread is planned to form an interleaving execution path, and the method comprises the following steps:

setting a plurality of breakpoints of the plurality of program sections of the multithreading in a program debugging frame displayed on a screen of the computer system;

converting the plurality of breakpoints into a plurality of context switch points in a breakpoint panel window in the program debugging frame displayed on the screen;

executing, by the computer system, the planned execution sequence of the interleaving execution path, to start a specified thread to execute one program section thereof till a program position corresponding to a first context switch point is reached;

clicking a next thread of the interleaving execution path one after another in a thread control panel window in the program debugging frame displayed on the screen, and executing, by the computer system, the clicked next thread till a next context switch point is reached;

recording and storing the interleaving execution path executed by the computer system at each context switch point;

determining whether an error occurred in any of the interleaving execution paths defined by the breakpoints;

reproducing the error by reexecuting the program section of the recorded and stored interleaving execution path in which the error occurred;

setting a new breakpoint in the program section of the recorded and stored interleaving execution path in which the error occurred;

executing, by the computer system, the thread till a new context switch point converted from the new breakpoint is reached; and recording and storing the interleaving execution path executed by the computer system at new context switch point.

2. The method according to claim 1, wherein next thread of the planned execution sequence of the interleaving execution path is clicked one after another in the thread control panel window, and the computer system executes the clicked next thread till execution of the to-be-debugged program is finished.

3. A non-transitory computer readable recording medium with a program stored therein, wherein when a computer system loads the program from the non-transitory computer readable recording medium and executes the program, the method according to claim 1 can be completed.

* * * * *